United States Patent [19]

Cook et al.

[11] Patent Number: 5,504,757
[45] Date of Patent: Apr. 2, 1996

[54] METHOD FOR SELECTING TRANSMISSION SPEEDS FOR TRANSMITTING DATA PACKETS OVER A SERIAL BUS

[75] Inventors: Sherri E. Cook, Boca Raton; Andrew B. McNeill, Jr., Deerfield Beach, both of Fla.

[73] Assignee: International Business Machines Corporation, Armonk, N.Y.

[21] Appl. No.: 313,483

[22] Filed: Sep. 27, 1994

[51] Int. Cl.6 .................................................. H04L 12/02
[52] U.S. Cl. ............................ 370/84; 370/94.3; 375/225
[58] Field of Search ...................................... 375/219, 225, 375/377; 371/5.5; 370/13, 17, 79, 84, 94.3, 119

[56] References Cited

U.S. PATENT DOCUMENTS

| | | | |
|---|---|---|---|
| 4,710,925 | 1/1987 | Negi | 371/5.5 |
| 5,157,651 | 10/1992 | Ghelberg et al. | 375/225 |
| 5,247,546 | 9/1993 | Abbiate et al. | 375/377 |
| 5,289,460 | 2/1994 | Drake, Jr. et al. | 370/94.3 |

OTHER PUBLICATIONS

"IEEE Standard for a High Performance Serial Bus", The Institute Of Electrical And Electronic Engineers, Inc., Draft 7.1v1, IEEEP1394, Aug. 5, 1994 pp. i–407.

Marazas, et al., "Information Technology—SCSI-3 Serial Bus Protocol (SBP)", X3T10 992D, Rev. 18, Working Draft, Aug. 11, 1994, pp. i–50.

*Primary Examiner*—Benedict V. Safourek
*Attorney, Agent, or Firm*—Felsman, Bradley, Gunter and Dillon; R. S. Babayi

[57] ABSTRACT

In a tree topology network, a method for determining the maximum transfer speed for data packets transmitted over a high performance acyclic serial bus is disclosed. The acyclic serial bus, patterned along the lines of the IEEE 1394 standard, is capable of operating at multiple transmission rates, depending upon the transmission rate of any particular node. Once the transfer speeds have been determined by finding transmission rates to and from an ancestor node, an efficient storage technique for representing the transfer speeds is also disclosed. The method supports packet speed selection for all types of data packets allowed by the IEEE standard, such as, for example, asynchronous, isochronous and broadcast packets.

12 Claims, 4 Drawing Sheets

METHOD FOR SELECTING TRANSMISSION SPEEDS FOR TRANSMITTING DATA PACKETS OVER A SERIAL BUS

CROSS-REFERENCE TO RELATED APPLICATION

The present application is related to U.S. patent application Ser. No. 08/313,680, filed on Sep. 27, 1994, entitled "Method And System For Matching Packet Size For Efficient Transmission Over a Serial Bus," U.S. patent application Ser. No. 08/312,854, filed on Sep. 27, 1994, entitled "Acyclic Cable Bus Having Redundant Path Access", U.S. patent application Ser. No. 08/313,679, filed on Sep. 27, 1994, entitled "Method For Generating A Topology Map For A Serial Bus", U.S. patent application Ser. No. 08/312,746, filed on Sep. 27, 1994, entitled "Method And System For Determining Maximum Cable Segments Between All Possible Node To Node Paths On A Serial Bus", U.S. patent application Ser. No. 08,313,490, filed on Sep. 27, 1994, entitled "Method And System For Automatically Generating A Read Response Packet With Speed Matching Over A Serial Bus", U.S. patent application Ser. No. 08/313,638, filed on Sep. 27, 1994, entitled "Method And System For Dynamically Appending Data To Data Structures For Transmission Over A Serial Bus", and all filed of even date herewith by the inventors hereof and assigned to the assignee herein, and incorporated by reference herein.

BACKGROUND OF THE INVENTION

1. Technical Field:

The present invention relates generally to data transmission on a computer system and, more particularly, to a method for selecting a transmission speed for sending data packets over a serial bus having a plurality of nodes. More specifically, the present invention relates to a method for selecting the maximum data rate at which data can be transmitted between selected nodes on the high performance acyclic serial bus.

2. Description of the Related Ad:

The IEEE has proposed a new standard under IEEE 1394 for a high performance serial bus cable environment that includes a network of nodes connected by point-to-point links called physical connections. The physical connections consist of a port on each of the nodes and the cable between them. A node can have multiple ports, which allows a branching multi-hop interconnect. The limitations on this topology are set by the requirement for the fixed round-trip time needed for the arbitration protocol. The default timing set after a bus reset is adequate for 16 cable hops, each of 4.5 meters for a total of 72 meters. The maximum number of nodes supported on a single bus is 63.

Whenever a node is added to or removed from the 1394 serial bus, a bus reset occurs that forces all nodes to a known state. After a bus reset, the tree identify (ID) process translates the general network topology into a tree, where one node is designated a root and all of the physical connections are labeled as either a parent, a child, or as unconnected. Any unconnected ports are labeled as off and do not participate any further. The tree must be acyclic, meaning no loops allowed; otherwise, the tree ID process will not be completed.

The 1394 cable environment supports multiple data rates of 98.304, 196.608, 393.216 megabits per second. The lowest speed is known as the base rate, and all ports that support a higher data rate must also support the lower data rate. Nodes capable of data rates greater than the base rate exchange speed information with its peers through its attached ports during the speed signalling phase of normal bus arbitration. If a peer node is incapable of receiving high speed data, then data will not be propagated down that path. Data will only be propagated down paths that support the higher data rate.

During data packet transmission, the source node sends a speed code, format and transactions codes, addresses of the source and destination nodes, and data. The destination field in this packet is used by each node's link layer to determine if it is the recipient of the transmitted data. The maximum speed at which a data packet can be transmitted depends on the bus topology and the data transmission speed supported by the nodes on the bus. To determine the optimum speed at which a data packet may be sent, the maximum supported speeds of the transmitting and receiving nodes as well as the maximum speed of any nodes connected between these nodes must be determined. The optimum speed for data transmission is equal to the highest speed which is supported by all the nodes, which are required to participate in the transmission of the data packet.

Accordingly, a method is needed to determine the maximum data transfer speed between a source and destination node by traversing a direct path between the two nodes via the parent links. What is also needed is a method for obtaining the data transfer speed prior to each isochronous transfer rather than storing the predetermined speed for every node to node combination.

SUMMARY OF THE INVENTION

It is therefore one object of the present invention to provide data transmission on a computer system.

It is another object of the present invention to provide a method for selecting a transmission speed for sending data packets over a serial bus having a plurality of nodes.

It is yet another object of the present invention to provide a method for selecting the maximum data rate at which data can be transmitted between selected nodes on the high performance acyclic serial bus.

The foregoing objects are achieved as is now described. According to the present invention, a method for determining the maximum transfer speed for a high performance acyclic serial bus is disclosed. The acyclic serial bus, patterned along the lines of the IEEE 1394 standard, is capable of operating at multiple transmission rates, depending upon the transmission rate of any particular node. Once the transfer speeds have been determined, an efficient storage technique for representing the transfer speeds is also disclosed. The method supports packet speed selection for all types of data packets allowed by the IEEE standard, such as, for example, asynchronous, isochronous and broadcast packets.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
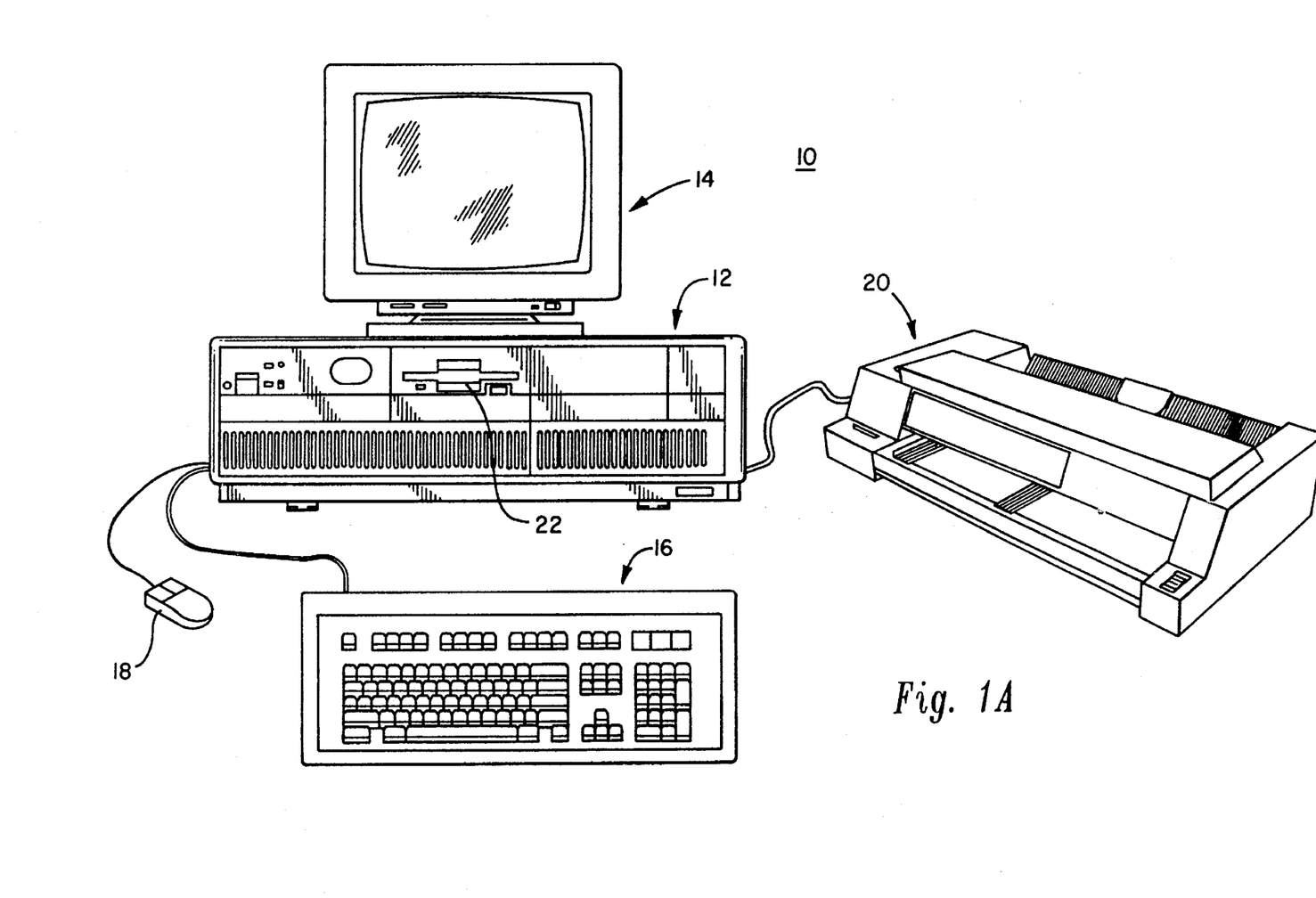
FIG. 1A depicts a data processing system in the form of a personal computer in which the present invention can be employed is depicted.

Referring now to the figures, and in particular to FIG. 1A, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 1B:
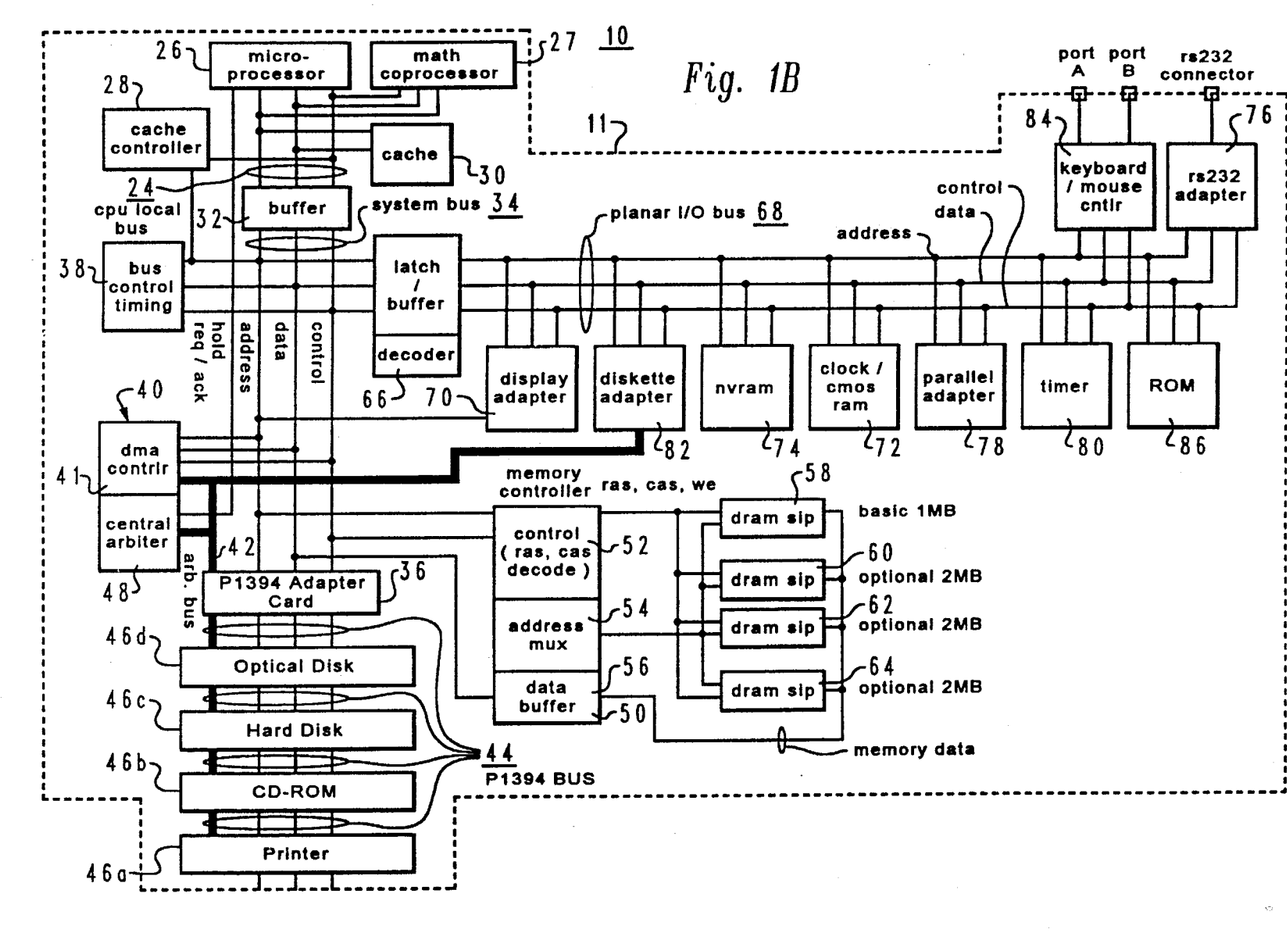
FIG. 1B is a block diagram of a personal computer system illustrating the various components of personal computer system in accordance with the present invention.

Prior to relating the above structure to the present invention, a summary of the operation in general of personal computer system 10 may merit review. Referring to FIG. 1B, there is shown a block diagram of personal computer system 10 illustrating the various components of personal computer system 10 in accordance with the present invention. FIG. 1B further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 1B, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 1B, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a P1394 adapter card 36. System bus 34 is further connected to a bus control and timing unit 38 and a Direct Memory Access (DMA) unit 40. DMA unit 40 is comprised of a central arbitration unit 48 and a DMA controller 41. P1394 adapter card 36 provides an interface between the system bus 34 and the P1394 Serial Bus 44. Connected to P1394 bus 44 are a plurality of devices or nodes 46a–46d such as optical disk, hard disk, CD-ROM, etc. In the depicted example, node 46c is a hard disk drive, node 46b is a CD-ROM drive, and node 46a is a printer device connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the perdonal computer system 10 is shown with a basic 1 megabyte RAM module, it is understood that additional memory can be interconnected as represented in FIG. 1B by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Since each P1394 slot or node within the computer system of FIG. 1A may operate at one of three speeds, there needs to be an efficient method by which a bus topology map can be constructed using the self ID packets. An efficient data structure for representing this bus topology map is useful in order to minimize packet transmission time between any two nodes in the network. The map is necessary to determine the maximum number of cable hops between any two devices, or nodes, for tuning the interpacket transmission gap timing, and also to determine the maximum data transmission speed between any two nodes.

In order to determine the maximum data packet transfer speed, a topological map of bus nodes, or devices, and interconnections, or cable segments, is necessary. The topology map is built into the following data structure during configuration management.

ID used as a direct index into the array. A method for establishing the topology map is disclosed in co-pending U.S. patent application Ser. No. 08/313,679, filed on Sep. 27, 1994, entitled METHOD FOR GENERATING A TOPOLOGY MAP FOR A HIGH PERFORMANCE SERIAL BUS, incorporated by reference herein for all purposes.

Since each child node has only a single parent node, except the root node, which does not have a parent, the topology map can be represented by only storing the parent associated with each node. This information is stored directly in an array. Thus, an array of parents represents the full topology with the index as the child node. The data rate method relies only on this parent knowledge to determine the maximum data transfer speed. With this parent information, the system can traverse a direct path between any two nodes in the topology in an efficient manner.

Figure 2:
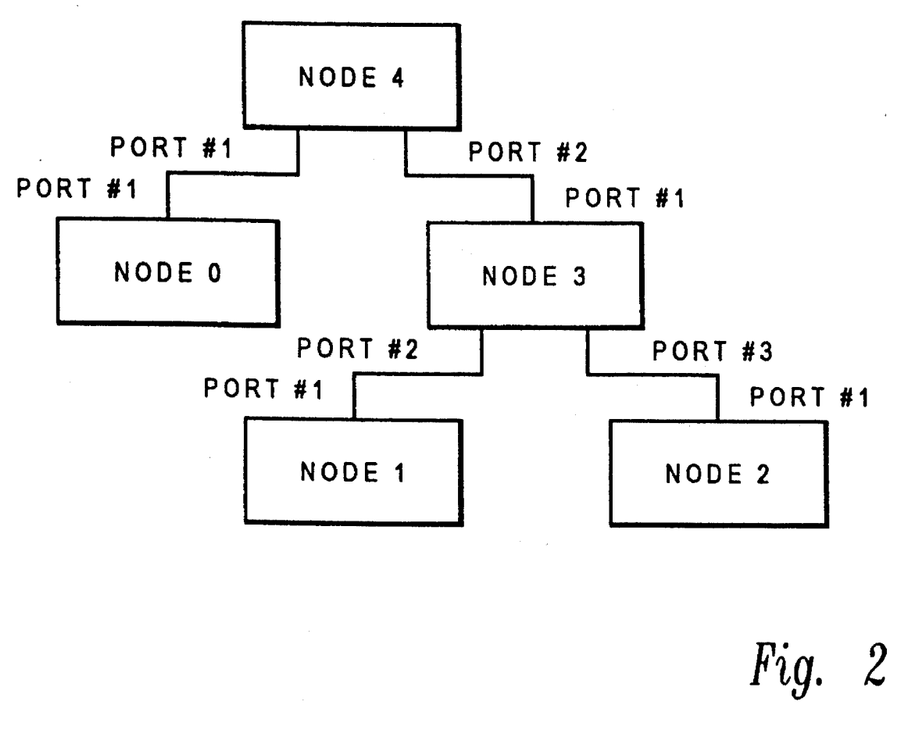
FIG. 2 is a block diagram representing a tree topology network node arrangement according to the present invention; and, FIG. 3 depicts a flowchart illustrating how an optimal data transmission rate may be generated according to the present invention.

The topology information from FIG. 2 is represented by the following array information:

| node | parent |
|------|--------|
| 0 | 4 |
| 1 | 3 |
| 2 | 3 |
| 3 | 4 |
| 4 | X (root has no parent) |

In FIG. 2, a 5-node network serial bus is illustrated. Each node from 0 through 4 has been attributed its maximum data transmission speed. For example, node 0 has a transmission speed of 400 megabits per second while node 1 has a transfer speed of approximately 100 megabits per second. The remaining nodes, nodes 2–4, have a transmission speed of approximately 200 megabits per second.

The method for determining the transmission speed between nodes is based upon the following facts from the IEEE 1394 High Performance Serial Bus standard, herein incorporated by reference. First, the root always has the highest node ID on the bus. Second, each node has at most one parent. Third, with the exception of the root, a node with zero children is considered a leaf. A leaf node has only one connected port; which is a parent port. Fourth, with the exception of the root, a node with one or more children is considered a branch. A branch node has two or more connected ports; which are one parent port and one or more child ports. For the purpose of the topology mapping method, the root is always processed as a branch, except for the single root node case. Fifth, each parent has a higher node ID than each of its children from the self ID process.

The transmission speed determination is based on taking two nodes as input, the transmitting node and the receiving

```
struct node_info
{
    unsigned char parent;         // number of parents & parent of node
    unsigned char children;       // number of children
    unsigned int speed        :2; // speed of this node              2 bits
    unsigned int gap_cnt      :6; // gap count                       6 bits
    unsigned int link         :1; // link power status               1 bit
    unsigned int power        :3; // power class                     3 bits
    unsigned int config_mgrc  :1; // config manager capable          1 bit
    unsigned int speed2init   :2; // speed from node to initiator
    unsigned int leaf         :1; // leaf node = 1, non-leaf node = 0
} node{MAX_DEVICES];              // array of nodes
```

This 4-byte structure represents all information associated with a single node. An array of structures represents all information associated with multiple nodes, with the node node. These nodes are then looked at as branches in a tree, one with the lower ID being the left branch and the other with the higher ID being the right branch. The nodes are compared by starting at the left node and moving up the branch via the parent node to determine the maximum speed for that branch. The left branch traversal stops at the ancestor that is common to both the left and right branches. Since all children of a node are a lower ID than its parent, the algorithm uses this information to determine the common ancestor that connects the left and right branches. This is found by finding the node whose ID is greater than or equal to the right node ID in the path. When this common ancestor is reached via the left branch, then the right branch is transversed starting at the right node. The same technique is used to work towards the common ancestor via the right branch. If a node is reached along the left or right branch that is the lowest possible data rate, or base rate, then the search stops and this data rate becomes the maximum data rate. Once either the base data rate has been found or both branches have been traversed, the system is complete and the maximum data rate is established based on the results obtained. The program, which is in C language found in Appendix A, is one embodiment capable of determining the highest data transmission rate possible between any two nodes. The code in Appendix A is illustrated in the flowchart of FIG. 3.

Based on the topology data rate example in Table 1, if the system needs to find the maximum data transfer speed between node 0 and node 1, the system makes node 0 the left branch and node 1 the right branch. The system then checks for the maximum data rate of the left branch and then uses this speed to determine the maximum data rate of the right branch. Since all children of a node have a lower ID than their respective parents, the system uses this information to determine the common ancestor that connects the left and the right branches. In FIG. 2, for example, node 4 connects these two branches. The speed for node 0 is approximately 400 megabits per second and is compared to its parent node's speed. Since node 4 is the parent for node 0 and node 4's speed is 200 megabits per second, which is less than 400 megabits per second, 200 megabits per second becomes the maximum data rate. Since node 4 is greater than the right branch node, the system knows that this node is the common ancestor to the left branch, which is now finished. The system then processes the right branch, by comparing node 1's speed of approximately 100 megabits per second to the current speed of approximately 200 megabits per second. Since node 1's speed is less than 200 megabits per second, the speed for node 1 then becomes the new maximum data rate. Since this is also the lowest rate possible, or the base rate, the search ends and 100 megabits per second becomes the maximum speed at which data can be transferred from node 0 to node 1.

Figure 3:
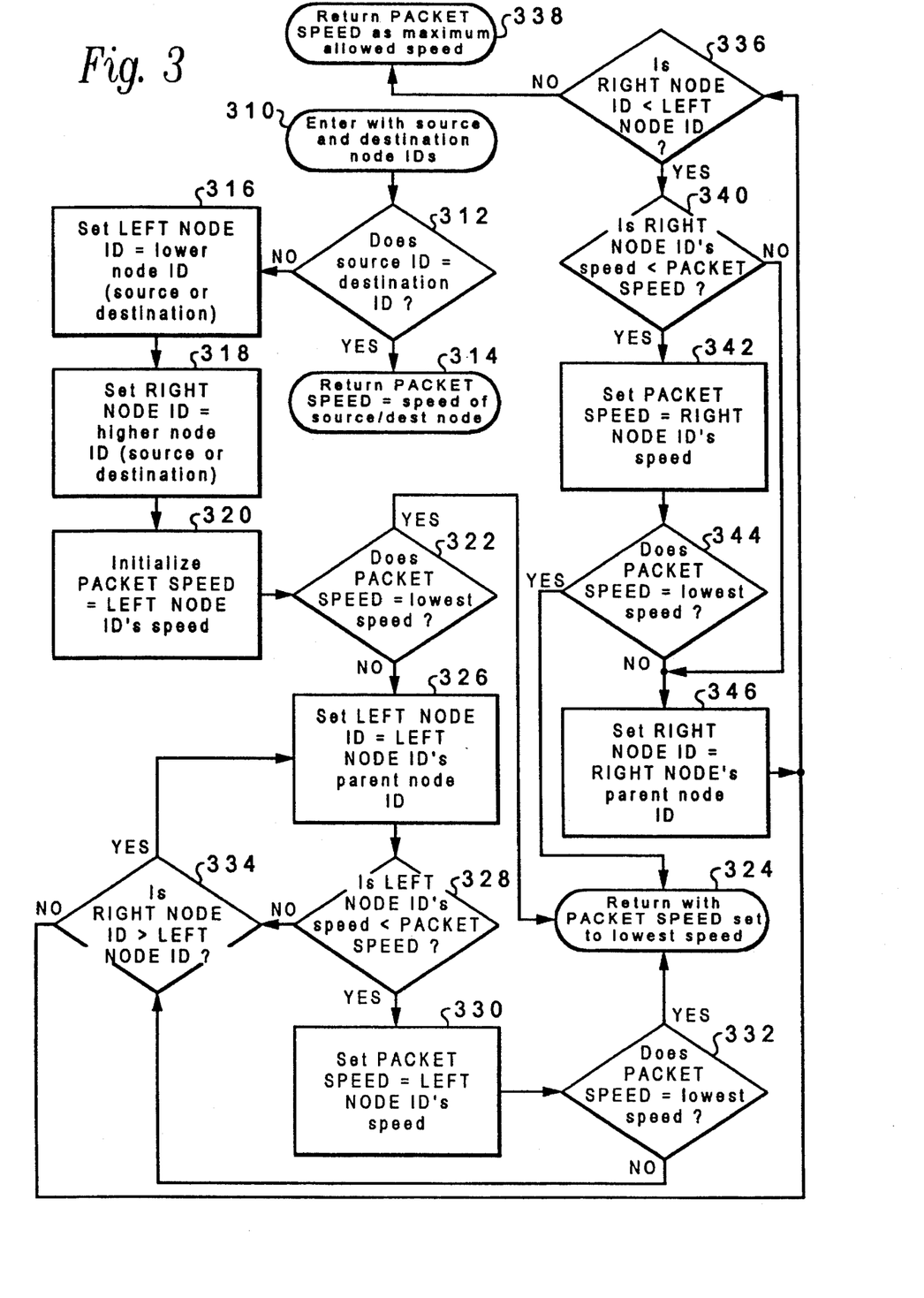

A flowchart illustrating the steps used by the system to determine the maximum data packet speed for data packet transmission is depicted in FIG. 3. At first, in step 310, the system enters the source and destination node IDs for all nodes in the network. In step 312, the system determines whether the source ID is the same as the destination ID, and if so, returns with the packet speed as equal to the speed of the source or destination node (step 314). If not, the system, in step 316, sets the left node ID to be equivalent to the lower node ID, which may be either the source or destination. In step 318, the system then sets the right node ID to be equal to the higher node ID, whether it is the source or destination ID. In step 320, the system initializes the packet speed to be equal to the left node ID's speed. After which, the system, in step 322, determines whether the packet speed is equal to the lowest speed possible, and if so, proceeds to step 324. In step 324, the system returns the packet speed as being set to the lowest speed possible. If the packet speed is not the lowest speed possible then, in step 326, the system sets the left node ID to be equal to the left node ID's parent node ID number.

In step 328, the system determines whether the left node ID's speed is less than the packet speed, and if so, the system proceeds to step 330. In step 330, the system sets the packet speed equal to the left node ID's speed and then, in step 332, the system determines whether the packet speed is now the lowest speed. If the packet speed is the lowest speed, then the system proceeds to step 324; otherwise, the system proceeds to step 334 where the system determines whether the right node ID is greater than the left node ID. If the right node ID is greater than the left node ID, the system then proceeds to step 326; otherwise, the system proceeds to step 336.

In step 336, the system determines whether the right node is less than the left node and if it is not, it proceeds to step 338, where it returns the packet speed as being the maximum allowed speed. If the right node ID is less than the left node ID, then the system in step 340, determines whether the right node ID's speed is less than the current packet speed. If it is, the system, in step 342 sets the packet speed to be equal to the right node ID's speed. The system then, in step 344 determines whether the packet speed is the lowest speed possible, and if so, the system proceeds to step 324. If the packet speed is not the lowest speed possible, the system, in step 346, sets the right node ID to be the same as the right node's parent node ID and then returns to step 336 until the right node ID is the same as the left node ID.

For another example of finding a maximum data rate between nodes in the bus of FIG. 2, node 4 and node 2 are selected. Node 2 is made the left branch since it is less than node 4 and node 4 is made the right branch. The transmission speed for node 2 is approximately 200 megabits per second as compared to its parent node's speed. Node 3 is the parent of node 2 and its speed is approximately 200 megabits per second. Accordingly, the data rate does not need to be changed. Since the system has not reached the common ancestor of the two branches yet, the system continues up the branch to the parent of node 3, which is node 4. Node 4's speed is approximately 200 megabits per second, which is not less than the current maximum data rate. Thus, 200 megabits per second remains the data rate for transmission. Since the system is now at the common ancestor, the system is finished with the left branch and now is ready to process the right branch. Since there is no right branch, the search is completed and 200 megabits per second is established as the maximum data transmission rate at which node 2 can transfer data to node 4.

The system is efficient in establishing the maximum data transmission rate because the number of node comparisons between the source and destination nodes directly equals the number of cable hops between the respective nodes. For example, only two distinct node comparisons were required to determine the maximum common speed from node 2 to node 4. Node 2 was compared to node 3 and node 3 was compared to node 4. If each cable hop were 4.5 meters, then the maximum number of cable hops between the two nodes could not be greater than 16; therefore, the maximum number of node comparisons from source to destination could not be more than 16. If there were 63 nodes on the bus, which is the maximum number of nodes, there still would not be more than 16 comparisons in a worst case. If the cable between each hop were less than 4.5 meters, then it is possible to have more than 16 cable hops, potentially as many as 18 to 20 hops in such a situation.

The present method of establishing the maximum data transmission rate is also effective in reducing memory storage that would otherwise be required for a lookup table of established rates. For example, the data rates could be stored in a two-dimensional array with the source and destination nodes as the index. Unfortunately, this requires additional storage. For such a two-dimensional array, there would need to be N*N bytes of storage where N=the total number of nodes on the bus. Thus, the maximum storage necessary for a full bus would be 63*63 or 3969 bytes of storage. This array would be fast in that it can use direct indexing, but does require approximately 4K bytes of storage. Further, the storage requirements could be reduced by half since the data rate from node X to node Y is the same as the data rate from node Y to node X. Thus, only half the size of an N by N array is required to represent the speed from any node to any other node. Accordingly, the maximum storage necessary for a full bus would be 63*63/2 or 1985. Although the storage would be reduced by half, the indexing scheme would be quite complex in order to determine the appropriate transmission rate for the appropriate nodes.

Further storage savings could be achieved based on the fact that the data rate is only 2-bits, thus the speed of 4 nodes could be represented in a single byte. Accordingly, by packing the data rate information in half of an N by N array, the maximum storage necessary for a whole bus would then be 63*63/2/4 or 497 bytes of storage. Although less storage is required still, an even more complex computation would be required for indexing the stored array.

Accordingly, instead of storing the data transfer rate for all possible node to node combinations, the method described in this invention can be used to obtain the data transfer rate prior to each isochronous channel setup. This is possible because the execution time of the data transfer rate determination is negligible in comparison to the duration of a typical isochronous 1394 channel operation. Isochronous channel operations always involve a single node as a source of isochronous data and one or more additional nodes as destinations of the isochronous data. In the case where an isochronous channel operation involves multiple destination nodes, the same speed determination would be applied to each source/destination node combination and the data packet transmission speed chosen would be the lower of all the individual sources/destination node maximum speeds obtained.

The 1394 standard also defines a class of data packet transfers in which all nodes on the bus are meant to receive the same data from a single transmitting node. These type of data packets are sometimes called broadcast packets. In order for the transmitting node to guarantee that all other nodes on the 1394 bus will be able to receive a broadcast packet, the maximum speed at which the packet can be transmitted can be determined by picking the maximum common speed that is supported by all nodes on the 1394 bus. This can be readily determined by searching the topology map array information for the common maximum speed that all nodes on the bus support. Once the maximum speed has been determined, the maximum speed has been saved for immediate use whenever any node needs to send a broadcast data packet.

While the invention has been particularly shown and described with reference to a preferred embodiment, it will be understood by those skilled in the art that various changes in form and detail may be made therein without departing from the spirit and scope of the invention.

APPENDIX A

```
unsigned int speed (unsigned char node1, unsigned char node2)
{
   unsigned int speed;                      //maximum data transfer speed
   unsigned char left,                      //left node of common ancestor
   right;                                   //right node of common ancestor
   if(node1 < node2)
   {
     left = node1;                          //lower id node will always be left of the common ancestor
     right = node2;                         //higher id node will always be right of the common ancestor
   }
   else if (node1 > node2)
   {
     left = node2;
     right = node1;
   }
   else return (node[node1].speed);
   speed = node[left].speed;                //start with the left node speed
   if (speed == 0) return (0);              //lowest speed (98.304 Mbit/sec), no point in looking further
                                            //speed capabilities:   00 98.304 Mbit/sec (base rate)
   do                                       //                      01 98.304, and 196.608 Mbit/sec
   {                                        //                      10 98.304, 196.608, and 393.216 Mbit/sec
     left = node[left].parent;              //move up the left branch
     if (node[left].speed < speed)          //if speed is less, make this the new speed, packet can't transfer
     {                                      //to this node faster
        speed = node[left].speed;
        if (speed == 0) return (0);         //if lowest speed (98.304 Mbit/sec), no point in looking further
     }
   }
   while (right > left);                    //traverse the left branch of the common ancestor
   while (right < left)                     //traverse the right branch of the common ancestor
   {
     if (node[right].speed < speed)         //if speed is less, make this the new speed, packet can't transfer
     {                                      //to this node any faster
        speed = node[right].speed;
        if (speed == 0) return(0);          //if lowest speed (98.304 Mbit/sec), no point in looking further
     }
     right = node[right].parent;            //move up the right branch
```

APPENDIX A-continued

```
       }
       return(speed);           //return maximum packet speed between the two nodes
}
```

We claim:

1. In a multi-speed serial bus having a tree topology, a method for establishing an optimal data transmission rate between a first node and a second node comprising the steps of:

upon completion of establishing said topology, determining a common ancestor node between said first node and said second node;

comparing the data transmission rate of said first node with the data transmission rate of each node between said first and said ancestor node;

setting the data transmission rate from said first note to said ancestor node to be equal to the lowest data transmission rate associated with any node between and including said first node and said ancestor node;

comparing the data transmission rate of said second node to each node between and including said second node and said ancestor node; and establishing the data transfer rate between said first node and said second node as being the transfer rate associated with any node between said first node and said ancestor node and between and including said second node and said ancestor node, which any node has the lowest data transmission rate amongst said nodes.

2. The method according to claim 1 wherein if said first node, said second node, said ancestor node, or any node in between has the lowest data transmission rate possible of said plurality of said data transmission rates on said network, establishing the data transmission rate between said first node and said second node as said lowest data transmission rate.

3. The method according to claim 1 wherein said data transmission is performed asynchronously.

4. The method according to claim 1 wherein said data transmission is performed isochronously.

5. The method according to claim 1 wherein data transmission sends broadcast packets of information.

6. In a computer system using a serial bus having multiple transmission rates and having a tree topology, a method for establishing an optimal data transmission rate between a first node and a second node comprising the steps of:

upon completion of establishing said topology, determining a common ancestor node between said first node and said second node, said step further comprising:

establishing a first node path between said first node and said ancestor node and a second node path between said second node and said ancestor;

traversing those nodes for said first node path that provide an optimal data transmission rate of any node between said first node and said ancestor node;

traversing those nodes for said second node path that provide an optimal data transmission rate of any node between said second node and said ancestor node;

establishing the data transfer rate between said first node and said second node as being the lowest transfer rate after traversing both said first node path and said second node path.

7. The method according to claim 6 wherein if said first node, said second node, or saw ancestor node has the lowest data transmission rate possible of said plurality of said data transmission rates on said network, establishing the data transmission rate between said first node and said second node as said lowest data transmission rate.

8. The method according to claim 6 wherein said data transmission is performed asynchronously, 9. The method according to claim 6 wherein said dam transmission is performed isochronously.

10. The method according to claim 6 wherein said common ancestor node is determined while traversing said first node path by comparing the ID of said second node with each node ID in said first path until a node whose ID is greater than or equal to said second node's ID is found.

11. The method according to claim 9 wherein said lowest data transmission rate is established before establishing an isochronous channel operation.

12. The method according to claim 5 wherein said lowest data transmission rate is established by selecting a maximum common data transmission rate supported by all nodes.

* * * * *